April 15, 1952 M. LOOMIS ET AL 2,592,919
DOCKBOARD
Filed May 31, 1949 3 Sheets-Sheet 1

INVENTORS
Martin Loomis
Wayne M. Sanderson
By Frank C. Kirman
ATTORNEY

April 15, 1952 M. LOOMIS ET AL 2,592,919
DOCKBOARD
Filed May 31, 1949 3 Sheets-Sheet 2

INVENTORS
Martin Loomis
Wayne M. Sanderson
BY Frank C. Karman
ATTORNEY

April 15, 1952     M. LOOMIS ET AL     2,592,919
DOCKBOARD

Filed May 31, 1949     3 Sheets-Sheet 3

INVENTORS
Martin Loomis.
Wayne M. Sanderson.
By Frank C. Kirman
ATTORNEY

Patented Apr. 15, 1952

2,592,919

UNITED STATES PATENT OFFICE 2,592,919

DOCKBOARD

Martin Loomis, Clare, and Wayne M. Sanderson, Midland, Mich., assignors to Loomis Machine Company, Clare, Mich., a corporation of Michigan Application May 31, 1949, Serial No. 96,342

6 Claims. (Cl. 14—71)

This invention relates to dockboards for use in spanning space between a loading dock or platform and a railroad car, truck or carrier spotted beside a dock platform. Usually the car or truck is higher or lower than the loading dock platform, and is further subject to height variation as the load changes, or the vehicle rocks on its springs due to variation in loads, and all of which is taken care of in my new dockboard, the ramp of which extends at an angle between the two floor levels, which level varies in accordance with the conditions encountered in different types of cars and vehicles.

One of the prime objects of the invention is to design a simple, practical, and easily operable counterbalanced dockboard, the ramp of which can be easily and quickly raised and/or lowered and with a minimum of manual effort.

Another object is to provide a dockboard which safely bridges the space between the platform and the carrier, and which provides a smooth runway over which freight of any nature can be moved.

Still a further object is to design a dockboard that will not creep or become displaced during use, and which is movable transversely on the loading dock when necessary and desired.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
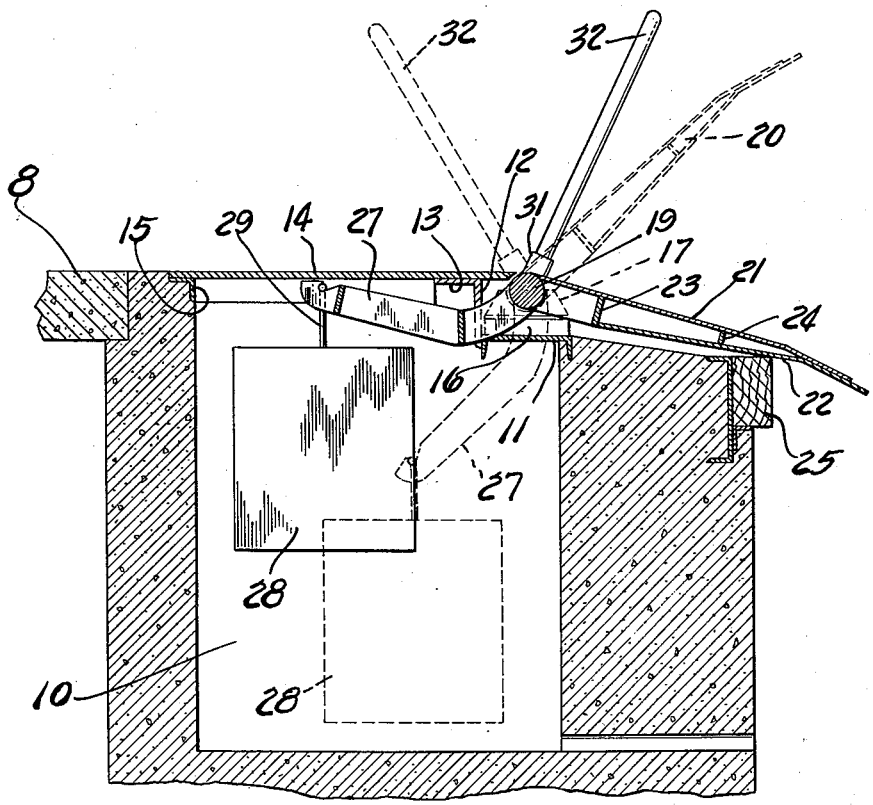
Fig. 1 is a sectional, end-elevational view of a loading platform with our improved dockboard in position thereon, the broken lines showing the ramp being swung to raised position.
Figure 5:
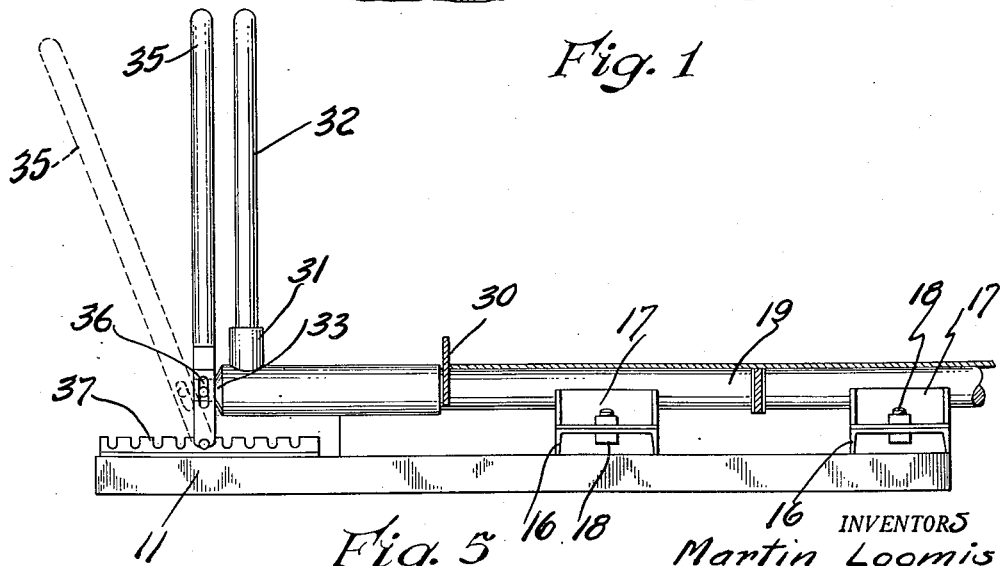
Fig. 5 is an enlarged, fragmentary, edge-elevational view of the endwise shifting mechanism, the broken lines showing the lever swung.
Figure 2:
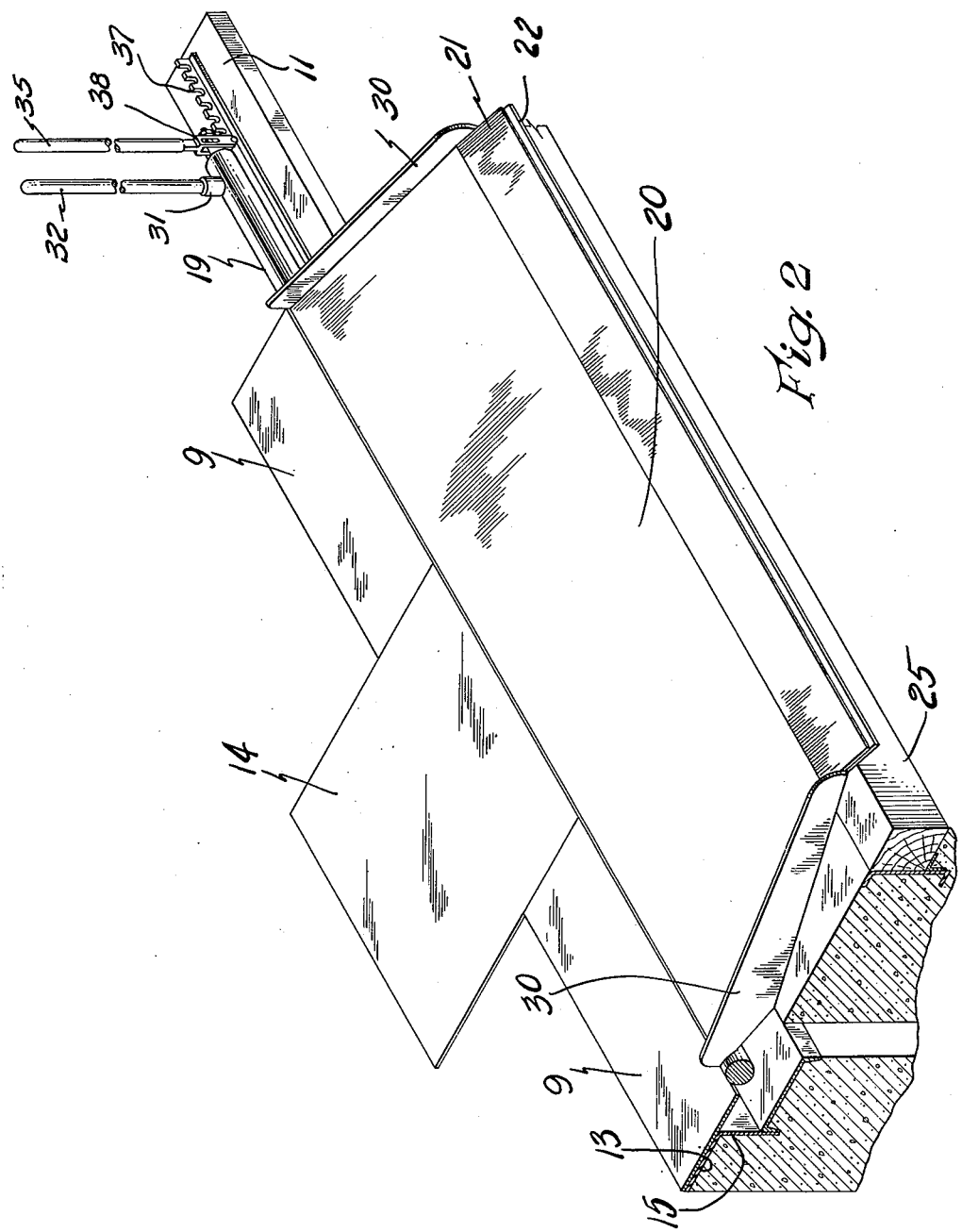
Fig. 2 is a perspective, top, plan view thereof.
Figure 4:
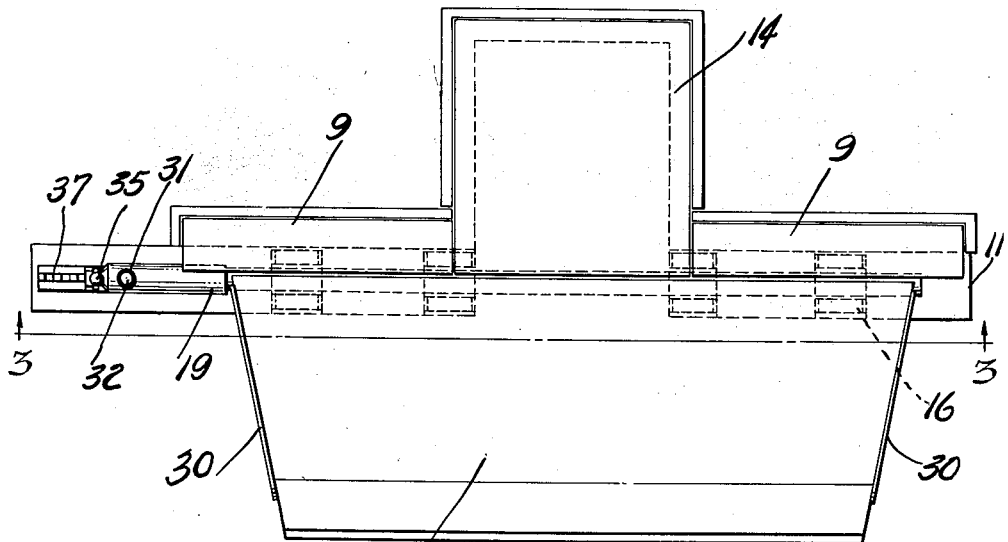
Fig. 4 is a top, plan view.
Figure 3:
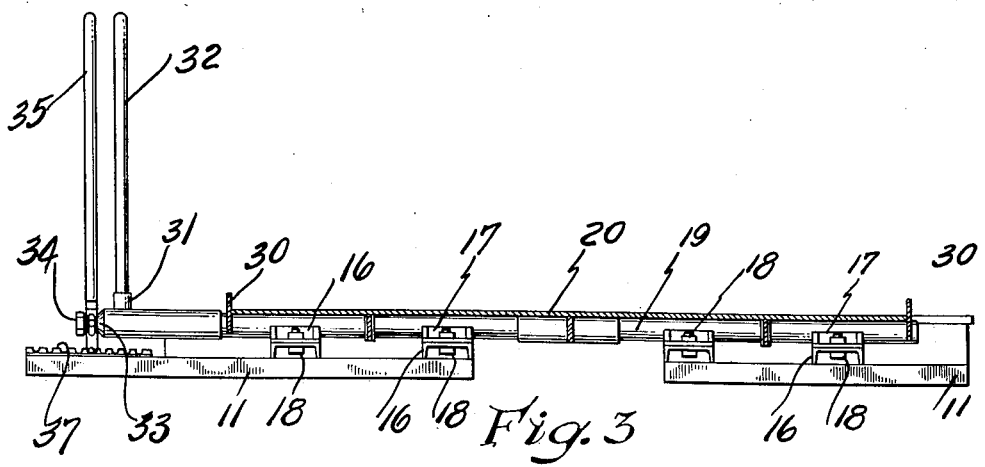
Fig. 3 is a part, sectional view taken on the line 3—3 of Fig. 4.

Dockboards of the nature herein referred to are subjected to heavy wear and must be rugged and substantial in construction to withstand the loading and unloading operations and the strains incident thereto caused by variations in the car or other carrier as the operation progresses.

When the loading or unloading operation is completed, the dockboard is usually swung up to avoid interference with the spotting of the next car or carrier, and to insure ease of operation we have provided a counterbalanced arrangement which permits the dockboard to be readily and easily raised and/or lowered.

In the instant application there is shown a dock 8 with a platform 9 as usual, a pit 10 being provided in said dock, and a channel member 11 spans said pit with an angle 12 welded to one edge thereof, the upper web 13 of which forms a support for one edge of a cover plate 14, angles 15 being anchored in the remaining walls of the pit opening for accommodating the remaining edges; this, however, is immaterial, as any other suitable arrangement may be utilized.

Bearing block supports 16 are welded on the channel 11 and bearing blocks 17 are secured thereon by means of bolts 18, a shaft 19 being rockably mounted in said blocks and to which one edge of a ramp member 20 is welded or otherwise secured, this ramp comprising upper and lower plates 21 and 22 spaced apart by means of spacer bars 23 and 24 interposed therebetween, the outer free edges of the plates being welded together in facial contact to form a relatively thin lip section, and a preferably wood beam 25 is provided on the upper outer edge of the pit and on which the ramp bears when not in use, it being understood that this outer edge rests on the floor of the car or carrier being loaded or unloaded.

Counterweight support arms 27 are welded to the shaft 19 at points intermediate its length and extend inwardly over the pit 10, and a counterweight 28 is releasably secured to the free ends of the arms by means of a bail 29 or in any other approved manner, the plates 14 and 21 being preferably formed to prevent slippage, and the edges of the plate 21 are flanged as shown to form side walls 30 to serve as guides etc.

A handle coupling 31 is welded to the shaft 19 in position as shown, and a tilt lever 32 is detachably mounted therein so that the shaft may be rocked in the bearing blocks 17 to swing the ramp to either raised or lowered position.

Inasmuch as the carriers do not always approach the dock directly in front of or in alignment with the ramp of the dockboard, a lateral movement is necessary, and we therefore turn the one end of the shaft 19 as at 33 and thread a shoulder bolt 34 in the end thereof, a shift lever 35 being secured by said bolt and is slotted as at 36 and for a purpose to be presently described.

A plurality of spaced-apart bars 37 are welded to the face of the channel 11 at the one end thereof and form teeth for engagement by the shouldered end 38 of the lever 35, the slotted opening 36 permitting the lever to be raised and lowered as necessary to effect such engagement, and when it is desired to shift the dockboard on the platform, the lever is placed in engagement with certain of the teeth 37, and then swung either toward or away from the end of the shaft 19, and the dockboard will be moved accordingly.

This construction provides for easy and quick manipulation of the dockboard. The ramp can be swung up by merely swinging the tilt lever 32 as indicated in dotted lines in Fig. 1 of the drawing, and this eliminates any projecting ramp or section on the loading dock when the carrier is moved into position for loading or unloading.

The design is rugged and substantial; it is easily and quickly operable, and with a minimum of manual effort, and can be readily manufactured and assembled.

From the foregoing description, it will be obvious that we have perfected a simple, practical and substantial loading dock which is easily operable to swing it to either raised or lowered position, which can be readily adjusted transversely to compensate for any misalignment of the vehicle carrier with the ramp of the dockboard.

What we claim is:

1. The combination with a loading dock having a pit therein, a dockboard for bridging the space between said dock and a flow of different height and comprising, a support, a horizontally disposed shaft rockably mounted thereon, a ramp structure on said dock and having its one edge rigidly secured to said shaft, said structure including vertically spaced plates, the outer edges of which are secured together in intimate facial contact to form a thin outer lip, arms on the side of the shaft opposite said ramp, a counterweight spaced from and secured to said arms, means for manually rocking said shaft, and means for shifting said shaft endwise in said supports.

2. The combination with a loading dock having a pit therein, of a longitudinally disposed support extending along the front edge of the pit, spaced-apart bearing blocks mounted on said support, a longitudinally disposed shaft rockably mounted therein, a ramp having its one end rigidly secured to said shaft, spaced-apart arms rigid on the shaft and extending in a direction opposite to said ramp, a counterweight on said arms, a tilt lever on one end of said shaft for swinging the ramp to raised and lowered position, and means on said shaft and engageable with said support for manually shifting said shaft and ramp endwise on said support.

3. The combination defined in claim 2 in which a coupling is provided on the longitudinally disposed shaft, and in which the tilt lever is releasably accommodated, teeth on said support, and a shift lever mounted on the end of the shaft and engageable with the teeth on the support for effecting endwise adjustment of said ramp assembly when said shift lever is actuated.

4. The combination of a loading dock having a pit therein, of a support spanning one side of said pit, a shaft rockable on said support, an outwardly projecting ramp section having its one edge rigidly secured to said shaft with its outer free edge terminating in a relatively thin lip, arms rigidly secured to the shaft opposite the ramp section and overhanging said pit, a counterweight on said arms, a manually operable tilt lever for rocking said shaft to raised and lowered positions, a shift lever rockably mounted for limited vertical movement on said shaft and means on said support and engageable by said shift lever for shifting said shaft and ramp on said loading dock.

5. The combination with a loading dock having a pit therein, of a support spanning one side of said pit, a shaft rockable on said support, an outwardly projecting ramp section having its one edge rigidly secured to said shaft with its outer free edge terminating in a relatively thin lip, arms rigidly secured to the shaft opposite the ramp section and overhanging said pit, a counterweight on said arms, a manually operable tilt lever for rocking said shaft to swing said ramp to raised and lowered positions, teeth on said support, and a shift lever mounted on the end of said shaft and engageable with said teeth for shifting said ramp longitudinally on said dock as the lever is swung in a direction parallel to the axis of the shaft.

6. The combination with a loading dock having a pit therein, of a support spanning one side of said pit, a shaft rockable on said support and formed with a conically-shaped end, an outwardly projecting ramp section having its one edge rigidly secured to said shaft with its outer free edge terminating in a relatively thin lip, arms rigidly secured to the shaft opposite the ramp section and overhanging said pit, a counterweight on said arms, a manually operable tilt lever for rocking said shaft to swing said ramp to raised and lowered positions, teeth on the support in alignment with said shaft, and a shift lever on said conically-shaped end and movable vertically with relation thereto to effect selective engagement with said teeth for shifting said dockboard when the shift lever is swung.

MARTIN LOOMIS.
WAYNE M. SANDERSON.

REFERENCES CITED

The following references are of record in the file of this patent:

UNITED STATES PATENTS

| Number | Name | Date |
|---|---|---|
| 1,001,800 | Von Babo | Aug. 29, 1911 |
| 1,027,724 | Haney | May 28, 1912 |
| 1,723,885 | Patterson | Aug. 6, 1929 |
| 2,141,529 | Gravelle | Dec. 27, 1938 |